Sept. 6, 1966 A. G. FRAME ET AL 3,271,263
NUCLEAR REACTOR WITH IMPROVED FUEL HANDLING APPARATUS
Filed June 17, 1964 3 Sheets-Sheet 1
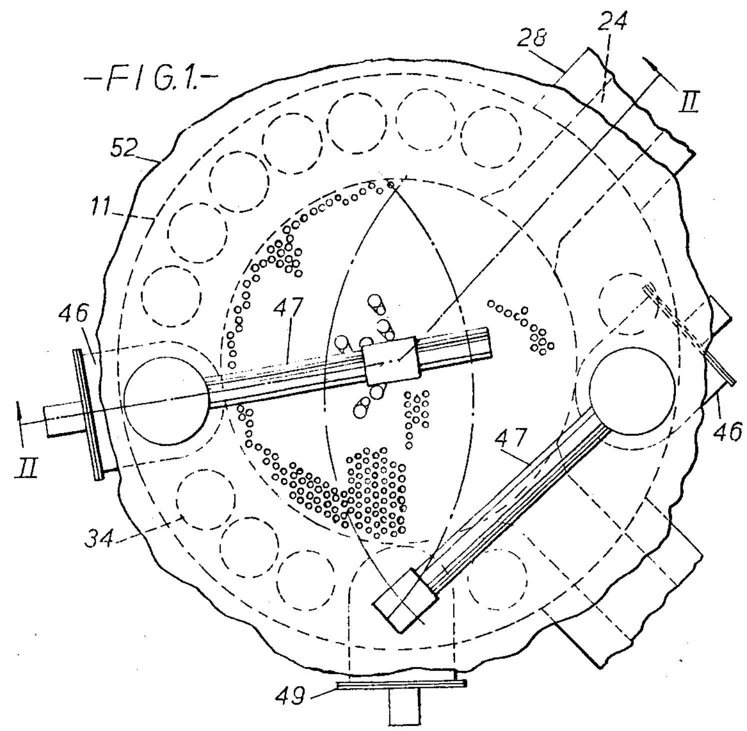
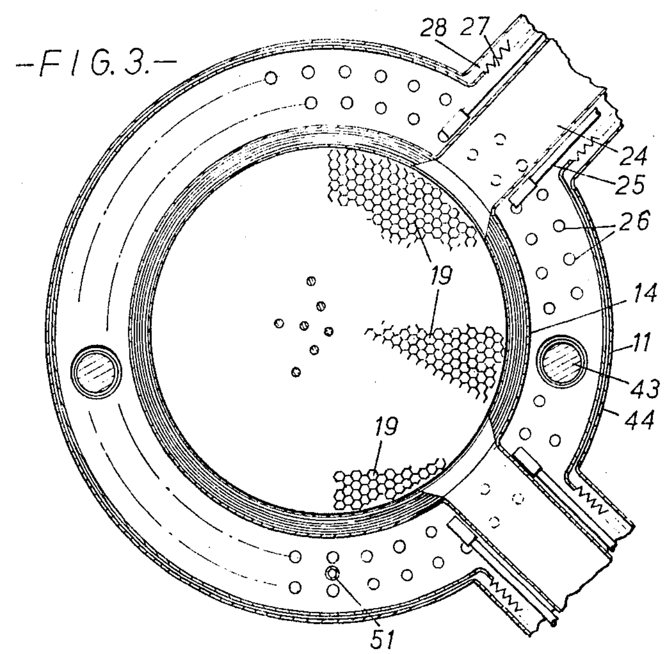

NUCLEAR REACTOR WITH IMPROVED FUEL HANDLING APPARATUS
Filed June 17, 1964 3 Sheets-Sheet 2
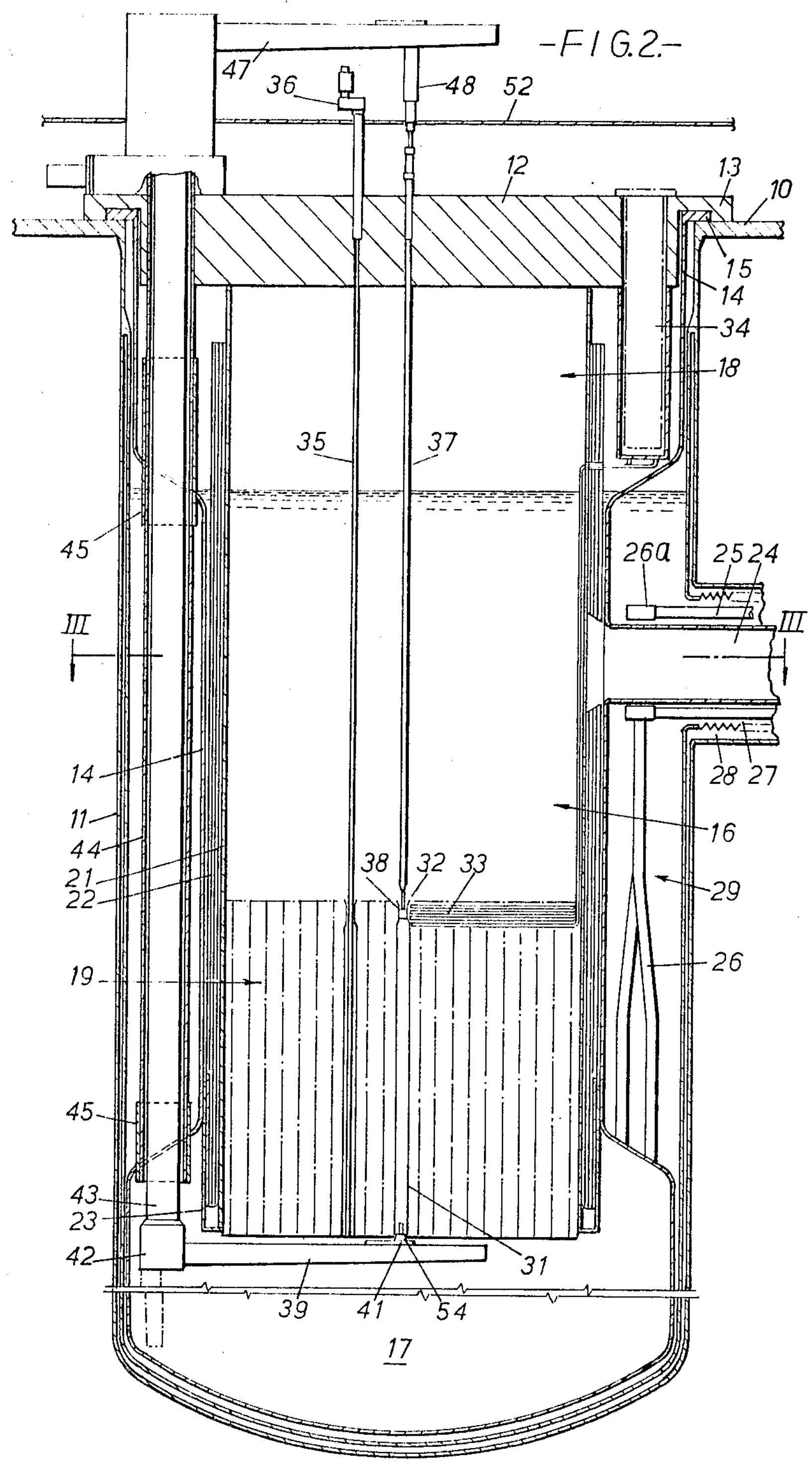

NUCLEAR REACTOR WITH IMPROVED FUEL HANDLING APPARATUS
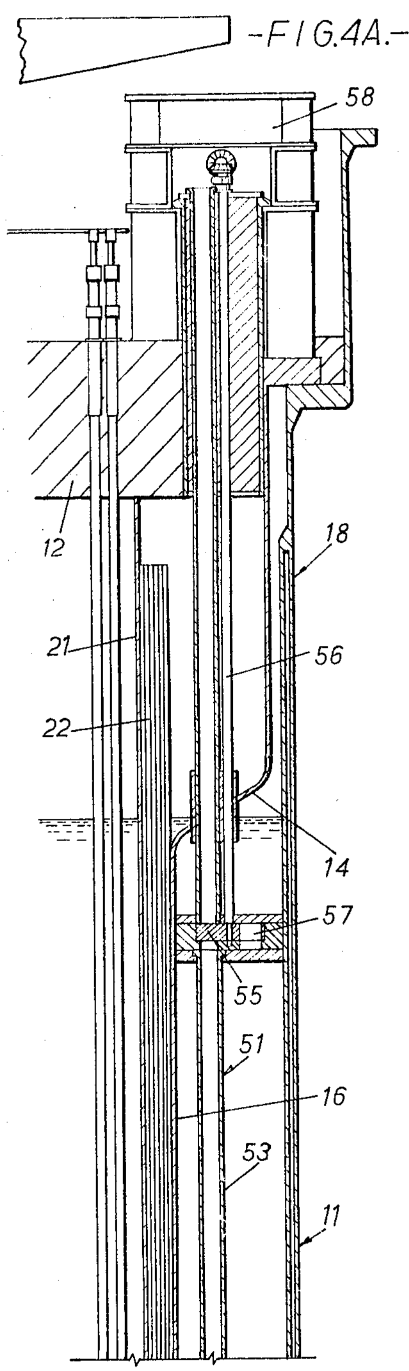
-FIG.4A.-
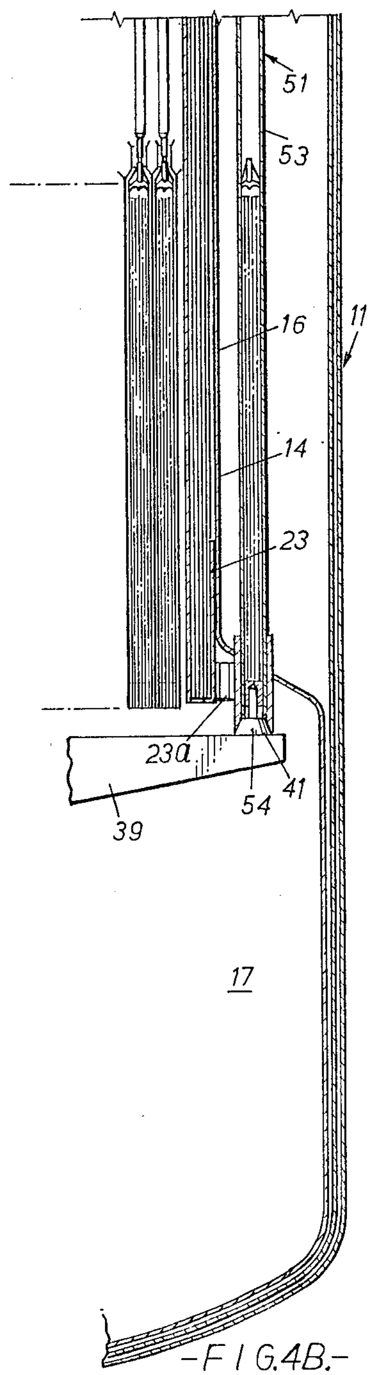
-FIG.4B.-
INVENTOR:
BY United States Patent Office 3,271,263

Patented Sept. 6, 1966

1

3,271,263
NUCLEAR REACTOR WITH IMPROVED FUEL HANDLING APPARATUS

Alexander Gilchrist Frame, Wilmslow, Horace Frank Parker, Culcheth, Warrington, John Stacey, Bolton, and Peter Liptrot Riley, Culcheth, Warrington, England, assignors to United Kingdom Atomic Energy Authority, London, England Filed June 17, 1964, Ser. No. 375,867
Claims priority, application Great Britain, June 25, 1963, 25,188/63
3 Claims. (Cl. 176—30)

This invention relates to nuclear fuel handling apparatus and is more specifically concerned with the kind of such apparatus which charges and discharges fuel units of a reactor core from beneath the core. An object of the invention is to provide apparatus of this kind enabling a fuel unit carrier beneath the core to be positioned by remote control in a manner which is simple and reliable and therefore less open to faulty operation.

According to the invention, nuclear fuel handling apparatus for charging fuel units into a nuclear reactor core housed in a reactor vessel comprises an upright shaft displaceable axially and rotatably in the vessel, a radial arm carried by the shaft adjacent its lower end for sweeping through an arc below the core, a fuel unit carrier supported by a traversable lengthwise of the arm, and means for controlling, externally of the vessel, the position of the fuel unit carrier, such means including a member which extends radially of the shaft axis and has a connection to the shaft for maintaining the radial arm coplanar with the member on displacement of the latter, a key carried by a traversable lengthwise of the member, and linkage to cause traverse of the key to be reflected by a corresponding traverse of the fuel unit carrier, whereby for any position of the key the carrier is positioned in alignment therewith.

One construction of nuclear reactor provided with fuel handling apparatus embodying the invention will now be described by way of example with reference to the accompanying drawings in which:

FIGURE 1 is a plan view of the reactor,

FIGURE 2 is a sectional elevation on the line II—II of FIGURE 1,

FIGURE 3 is a sectional view on the line III—III of FIGURE 2, and

FIGURES 4A and 4B placed end to end represent a sectional elevation of a fuel charge port for the reactor.

The components of the illustrated reactor are supported by a support platform which is a composite structure comprising a flange 10 (FIGURE 2), from which a double-walled reactor vessel 11 is dependent, and an upper reactor shield 12 having a flange 13 mounted on the flange 10; support structure for the flange 10 is omitted for the sake of clarity. A core tank 14 depending from the support platform is secured by an upper flange 15 interposed between the upper shield 12 and the flange 10. The tank 14 has a central waisted section 16, below which is a bulbous fuel handling section 17 and above which is an instrumentation section 18. Housed within the core tank, a cellular core tube assembly 19 is carried by a cylindrical baffle 21 dependent from the upper shield 12. A thermal shield 22 carried by the baffle 21 forms a close fit within the waisted section of the tank and is enclosed at its lower end in a casing 23 which is a sliding fit in the waisted tank section. The core tank is filled with reactor coolant in the form of liquid sodium which is circulated upwardly through the core tubes to abstract heat from fuel elements therein; the coolant leaves the tank by way of an outlet duct 24 and reenters the reactor vessel through piping 25 disposed in a coaxial inlet duct 27

2 which piping communicates through a ring header 26a with pipes 26 leading to the fuel handling section of the core tank which also serves as a high pressure coolant inlet plenum. The ducts 27 interconnect with the annular chamber 29 surrounding the waisted section of the tank the interiors of other tanks (not shown) in which are accommodated the heat exchangers to which the outlet ducts 24 conduct the hot coolant from the core lattice, these exchangers being arranged to discharge directly into the respective tank interior in the manner of an open cycle. Surrounding the duct 27 is a leakage duct 28 which is a continuation of the outer wall of the double-walled reactor vessel.

The core tube assembly 19 is a cellular structure of open-ended, hexagonal tubes 31 adapted to receive fuel and control units, each tube being formed with a cylindrical, waisted outlet 32 at its upper end and each being provided with a sampling pipe 33 by which a sample of the coolant in the channel can be taken to instrumentation designed to detect radioactive fission products in the sample and thus to indicate damage to a fuel unit in that tube. This instrumentation is housed in thimbles 34 in the upper section of the core tank to which groups of the pipes 33 are led. Control units 35 (of which one is indicated in FIGURE 2) take the form of elongate thimbles depending from the upper shield 12 and surmounted by drive mechanism 36 to actuate a screw mechanism for moving axially a neutron-absorbing control rod within the thimble. Struts 37 (of which one is indicated in FIGURE 2) also depend from the upper shield 12 and carry sockets 38 which are located over the core tubes 31 in the outlets 32. Elongate fuel units within the core tubes engage the sockets 38 and are supported by the struts without loading the tube assembly which serves only to impart lateral stability to the fuel units. During operation of the reactor the upward flow of coolant through the core tubes is so great as to impart a net upward force on the fuel units which is transmitted by the struts to the reactor support platform.

Fuel handling apparatus by which fuel units are raised into and lowered out of the core tubes comprises an arm 39 on which is traversable a carrier having a pintle 41 adapted to enter a socket in the lower end of a fuel unit and so act as a holder. The arm 39 is mounted radially at a joint 42 on an upright shaft 43 which is slidable and rotatable in a housing 44 carried in sleeve 45 welded to the core tank 14. The arm is pivotable about the joint 42 into a vertical position (indicated in broken lines) to enable it to be withdrawn through the housing 44. Control mechanism 46, which is supported on the upper shield 12 and from which the shaft 43 depends, carries a radial member or tiller 47 having a traversable indexing key 48, the tiller having a similar fixed relationship to the shaft as the arm 39 so that the arm and tiller are always in the same angular position and hence coplanar. Between the key and the carrier there is a direct mechanical linkage such that location of the key over a selected strut marking a selected fuel unit position in the core causes the pintle 41 to be aligned below the core tube associated with the strut; suitable mechanical linkages for this purpose will be readily apparent to those conversant with this field of design. For example traverse of the key may be carried out by means of a lead screw in the tiller and the rotation of such lead screw may be transmitted through a spindle inside the upright shaft and bevel gearing at the ends of this shaft to a corresponding lead screw adapted to effect the traverse of the carrier. A fuel unit carried by the pintle is raised or lowered by telescoping axial movement of the shaft 43, the arm 39 being held horizontal. The part of the key-to-carrier linkage in the shaft must of course be likewise telescopically extendable; in the case of the spindle previously quoted the spindle may be in two parts interconnected by a splined sleeve.

The fuel handling apparatus may be provided with interlocks (either mechanical or electrical) to control the movements of the apparatus, some of the interlocks being controlled by the key 48 carried by the tiller. This key is movable in a vertical direction so that it may be lowered into locating engagement with a selected strut to ensure that the pintle cannot be moved along the arm and that the arm cannot be swung about the joint 42 when the pintle is entered into a fuel unit. Similarly, interlocks ensure that the arm 39 cannot be raised or lowered unless the key is in a lowered position.

The reactor is provided with two sets of fuel handling apparatus (FIGURE 1) having arms of sufficient length to cover the whole lattice area with a considerable area of overlap in the centre. In practice the area of overlap corresponds to the active core area whilst the outer core tubes are reserved for breeder units containing fertile material and for storage of decaying fuel units. A fuel charge/discharge machine 49 is located over a charge port 51 which extends from the upper shield 12 down into the fuel handling section 17 of the core tank and which is accessible to both of the pintles 41. Fuel units are charged into the fuel handling section through this port. Access to the tiller 47 and the charge/discharge machine 49 is by a deck 52 spaced above the upper shield 12.

The charge port 51 (FIGURES 4A and B) is constituted by an upright tube 53 the lower end of which projects into the fuel handling section 17 of the core tank to be positioned there by a bracket 23*a* carried by the casing 23. At its lower end the tube 53 is formed with a conical mouth to receive a conical plug 54 with which the lower part of the pintle 41 is formed. Intermediate its ends the tube 53 is provided with a valve in the form of a rotary gate 55. The gate, which is rotatable through a drive spindle 56, has a single port 57 which can be aligned with the tube to permit passage of a fuel unit through the tube or can be displaced so that the gate blocks the tube. At their upper ends the tube 53 and the drive spindle 56 enter an adaptor 58 to which the fuel charge/discharge machine can be secured.

Fuel units can be charged into the fuel handling section 17 of the core tank while the reactor is in operation owing to the rotary gate 55 and the plug 54. During reactor operation the gate 55 is positioned to close the tube 53 and thus prevent leakage of high pressure reactor coolant up the tube. However, when a fuel unit is to be charged into the reactor through the tube, the pintle of the fuel handling apparatus is entered into the lower end of the tube so that the plug 54 seals off the conical mouth of the tube. With the plug 54 in place, the rotary gate may be opened and a fuel unit lowered through the tube onto the pintle. The gate is then closed and the fuel unit may be lowered out of the tube 54 by means of the fuel handling apparatus. Discharge of fuel units from the core tank during reactor operation may be carried out by a reversal of this process.

It is to be understood that the invention is not limited to the details of the foregoing example. Although the fuel handling apparatus has been described in association with one particular fast nuclear reactor (disclosed in copending application No. 375,868, filed June 17, 1964, and owned by the assignee of the instant invention) the apparatus is applicable to other types of nuclear reactor.

What we claim is:

1. Nuclear fuel handling apparatus for charging fuel units into a nuclear reactor core housed in a reactor vessel, the apparatus comprising an upright shaft displaceable axially and rotatably in the vessel, a radial arm carried by the shaft adjacent its lower end for sweeping through an arc below the core, a fuel unit carrier supported by and traversable lengthwise of the arm, and means for controlling, externally of the vessel, the position of the fuel unit carrier, such means including a member which extends radially of the shaft axis and has a connection to the shaft for maintaining the radial arm coplanar with the member on displacement of the latter, a key carried by and traversable lengthwise of the member, and linkage to cause traverse of the key to be reflected by a corresponding traverse of the fuel unit carrier, whereby for any position of the key the carrier is positioned in alignment therewith.

2. In a nuclear reactor having a core of upright fuel units in a reactor vessel and means on an upper surface of the vessel marking the positions of the units in the core, a fuel handling apparatus comprising an upright shaft displaceable axially and rotatably in the vessel, a radial arm carried by the shaft adjacent its lower end for sweeping through an arc below the core, a charge port penetrating the vessel wall, a fuel unit carrier supported by and traversable lengthwise of the arm to enable alignment of the carrier with fuel unit positions in the core and with the charge port, and means disposed externally of the vessel for controlling the position of the fuel unit carrier, such means including a member which extends radially of the shaft axis and has a connection to the shaft for maintaining the radial arm coplanar with the member on displacement of the latter, a key carried by and traversable lengthwise of the member for engagement with the fuel unit position marking means on the vessel upper surface, and direct mechanical linkage to cause traverse of the key to be reflected by a corresponding traverse of the fuel unit carrier, whereby to enable the carrier to be aligned beneath a selected fuel unit position by engagement of the key with the respective marking means.

3. A fuel handling apparatus according to claim 2, wherein the charge port has a tube with an open end inside the vessel and the fuel unit carrier has a fuel unit holder which is adapted to plug the open end of the tube on transfer of a fuel unit between the carrier and the tube.

No references cited.

L. DEWAYNE RUTLEDGE, *Primary Examiner.*

LEON D. ROSDOL, *Examiner.*